US009807276B2

(12) United States Patent
Sakahara et al.

(10) Patent No.: US 9,807,276 B2
(45) Date of Patent: Oct. 31, 2017

(54) IMAGE PROCESSING APPARATUS HAVING A DISPLAY DEVICE FOR DISPLAYING A TRIMMING RANGE SELECTION SCREEN, AND IMAGE PROCESSING METHOD

(71) Applicant: FURYU CORPORATION, Tokyo (JP)

(72) Inventors: Wakako Sakahara, Kyoto (JP); Yutaka Ohata, Kyoto (JP); Kohei Kawakami, Kyoto (JP); Shingo Hamaguchi, Osaka (JP); Hiroaki Onishi, Kyoto (JP)

(73) Assignee: FURYU CORPORATION, Tokyo (JP)

( * ) Notice: Subject to any disclaimer, the term of this patent is extended or adjusted under 35 U.S.C. 154(b) by 0 days.

(21) Appl. No.: 14/986,217

(22) Filed: Dec. 31, 2015

(65) Prior Publication Data
US 2016/0277632 A1    Sep. 22, 2016

(30) Foreign Application Priority Data

Mar. 17, 2015 (JP) .................................. 2015-054012

(51) Int. Cl.
*H04N 1/387* (2006.01)
*H04N 1/00* (2006.01)

(52) U.S. Cl.
CPC ....... *H04N 1/3873* (2013.01); *H04N 1/00251* (2013.01); *H04N 1/00265* (2013.01); *H04N 1/00411* (2013.01); *H04N 2201/0068* (2013.01)

(58) Field of Classification Search
None
See application file for complete search history.

(56) References Cited

U.S. PATENT DOCUMENTS

| 7,072,526 B2 * | 7/2006 | Sakuramoto | ......... H04N 1/3873 340/5.52 |
| 9,001,255 B2 * | 4/2015 | Matsuzawa | ........ H04N 5/23212 348/333.01 |
| 9,549,084 B2 * | 1/2017 | Imahira | .............. H04N 1/00289 |

FOREIGN PATENT DOCUMENTS

| JP | 2003069860 A | 3/2003 |
| JP | 4920175 B | 10/2005 |
| JP | 4625356 B | 10/2006 |
| JP | 5660240 B | 1/2015 |

* cited by examiner

*Primary Examiner* — Paul F Payer
(74) *Attorney, Agent, or Firm* — Capitol City TechLaw

(57) ABSTRACT

An image processing apparatus for photographing a user includes a photographing device configured to photograph the user to generate a photographed image; a display device configured to display a selection screen that is a screen with which the user selects one of a plurality of trimming ranges, the trimming range being a range of trimming a part of the photographed image generated by the photographing device; an instruction receiving device configured to receive selection of the trimming range on the selection screen; and a trimming processor configured to perform a trimming process on the photographed image generated by the photographing device based on the trimming range selected with the instruction receiving device.

14 Claims, 12 Drawing Sheets

Fig.9

|  | High | Middle | Low |
|---|---|---|---|
| USA | 185cm | 175cm | 170cm OR 165cm |
| JAPAN | 175cm | 165cm | 155cm |

Fig.10
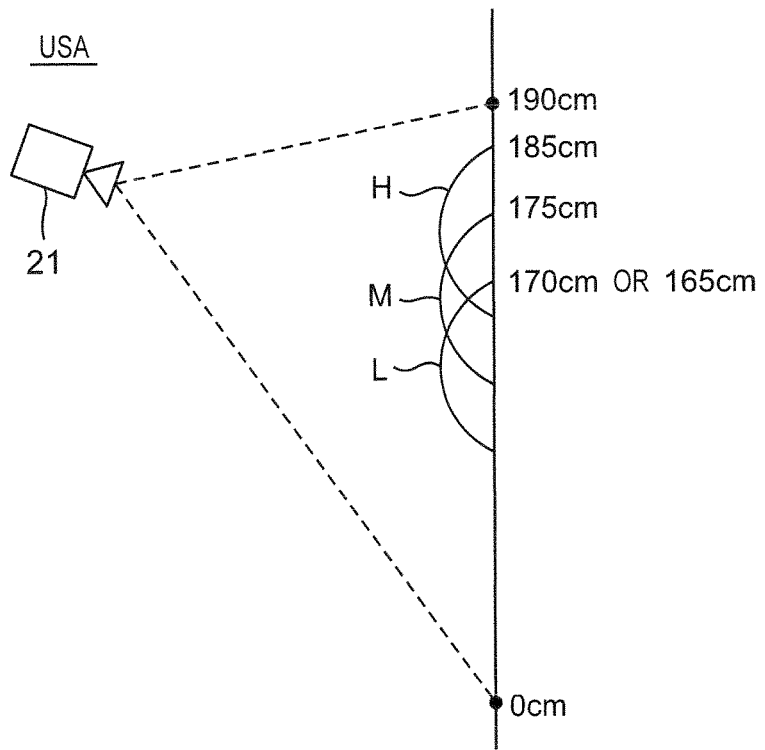
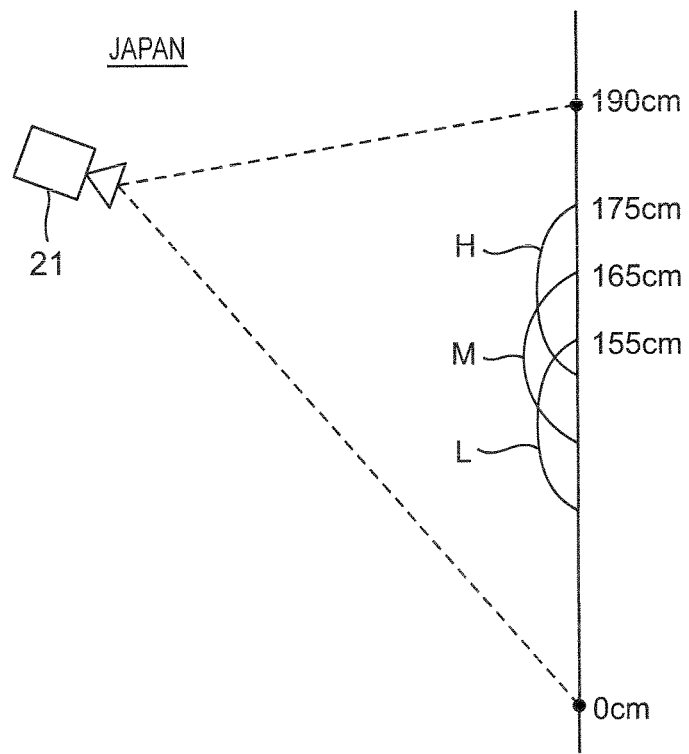

IMAGE PROCESSING APPARATUS HAVING A DISPLAY DEVICE FOR DISPLAYING A TRIMMING RANGE SELECTION SCREEN, AND IMAGE PROCESSING METHOD

BACKGROUND OF THE INVENTION

1. Technical Field

The present invention relates to an image processing apparatus for editing and printing a photographed image on a sticker sheet.

2. Related Art

Conventionally, a photo sticker creating apparatus is known that photographs a user (object) and that edits and prints a photographed image on a sticker sheet to provide the image as a photo sticker or to transmit the image as a photo image to a user's portable terminal (see, e.g., Patent Documents 1 (JP4920175B), 2 (JP2003-69860A), 3 (JP5660240B), and to 4 (JP4625356B)).

The photo sticker creating apparatus enables a user to enjoy a photo sticker creating operation as a game (a photo sticker creating game). The photo sticker creating game is performed in a flow including photographing an object, editing a photographed image, and outputting (printing) an edited image to a photo sticker. The user can play this series of steps within a limited time with the photo sticker creating apparatus and can receive a photo sticker created as a resulting product.

For example, Patent Document 1 discloses a photography printing apparatus capable of generating a good-looking photographed image acquired by performing an image processing with respect to a photographed image of a user, outputting the photographed image to a photo sticker sheet, and transmitting the photographed image to a portable terminal. Patent Document 2 discloses an image printing apparatus enabling a user to set a tilt angle of a camera before photographing. Patent Document 3 discloses a photo sticker creating apparatus capable of moving a monitor for displays a moving image and a photographed image in the proximity when the user sets a tilt angle of a camera. Patent Document 4 discloses an image processing apparatus capable of displaying a photographed image as images in compositions having a feature portion of the image located in different positions so that a user can select and print an appropriate image.

SUMMARY OF THE INVENTION

However, in Patent Documents 1 to 4 described above, a user must set a range of trimming, and therefore, a user's operation is complicated and is cumbersome for an inexperienced user.

An object of the present invention is to solve the aforementioned problems and provide an image processing apparatus, an image processing method, and an image processing program capable of setting a best composition in a short time without a complicated operation of a user.

An image processing apparatus according to the present invention is an image processing apparatus for photographing a user. The image processing apparatus includes a photographing device configured to photograph the user to generate a photographed image;

a display device configured to display a selection screen that is a screen with which the user selects one of a plurality of trimming ranges, the trimming range being a range of trimming a part of the photographed image generated by the photographing device;

an instruction receiving device configured to receive selection of the trimming range on the selection screen; and a trimming processor configured to perform a trimming process on the photographed image generated by the photographing device based on the trimming range selected with the instruction receiving device.

An image processing method according to the present invention is an image processing method for photographing a user as an object. The image processing method includes photographing a user;

displaying a selection screen that is a screen with which the user selects one of a plurality of trimming ranges, the trimming range being a range of trimming a part of the photographed image;

receiving selection of the trimming range on the selection screen; and performing a trimming process on the photographed image based on the trimming range.

A non-transitory computer-readable storage medium according to the present invention stores an image processing program for allowing a computer to execute the image processing method as described above.

According to the present invention, a user can select the trimming selection range (the photographing range) from a plurality of selection range candidates before photographing through a simple operation of touching a touch panel, and therefore, the user can select a best composition for photographing without a complicated operation. In addition, a plurality of the trimming selection ranges is set in advance, and therefore, when the user selects one selection range out of a plurality of the trimming selection ranges, a video corresponding to the selected photographing range is immediately displayed. Therefore, it is possible to suppress an increase in processing load to the photo sticker creating apparatus, and photograph in a short time.

BRIEF DESCRIPTION OF DRAWINGS

FIG. 9 shows a table for explaining a configuration of the trimming range.

FIG. 10 is a side view for explaining the configuration of the trimming range of FIG. 9.

DETAILED DESCRIPTION OF EMBODIMENTS

A specific embodiment of the present invention will now be described with reference to the accompanying drawings.

First Embodiment

A photo sticker creating apparatus of one embodiment of the present invention is a game apparatus (game service providing apparatus) allowing a user to perform photographing, editing, and the like as a game (game service) and providing a photographed/edited image as a photo sticker or data to the user. A photo sticker creating apparatus 1 is disposed in a game arcade, a shopping mall, a store in a tourist site, and the like.

In a game provided by the photo sticker creating apparatus, a user photographs himself/herself and the like with a camera disposed in the photo sticker creating apparatus. The user composes a foreground image and/or a background image to a photographed image, or edits the photographed image, thereby designing the photographed image into a colorful image. After the game ends, the user receives a photo sticker and the like printed with the edited image as a resulting product. Alternatively, the photo sticker creating apparatus provides the edited image to a user's portable terminal and the user can receive a resulting product with the portable terminal.

1. Configuration of Photo Sticker Creating Apparatus
  1.1. Appearance

Figure 1A:
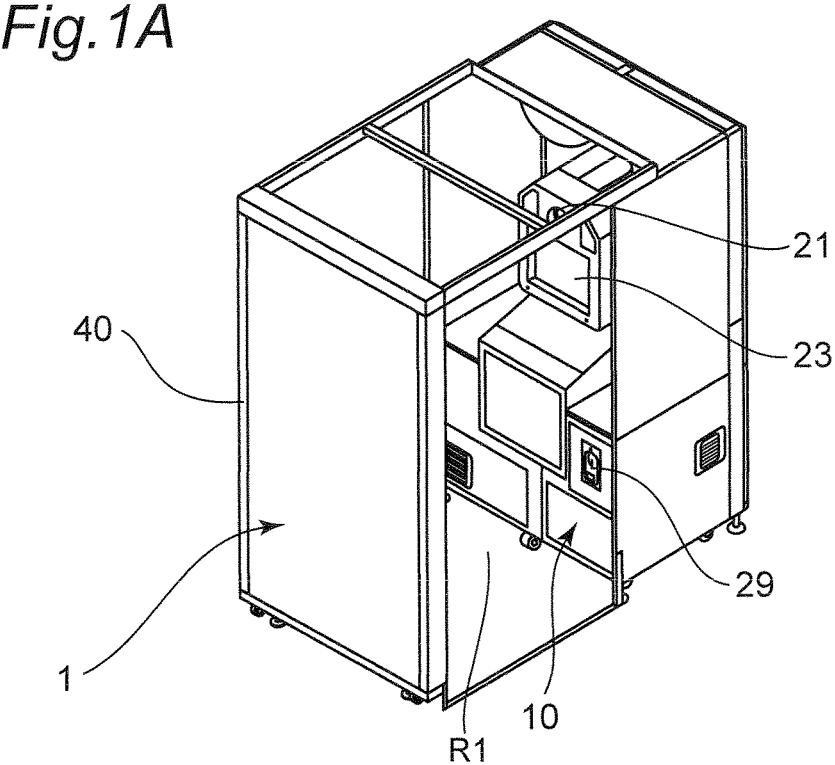
FIG. 1A is a perspective view of a photo sticker creating apparatus according to one embodiment of the present invention.
Figure 1B:
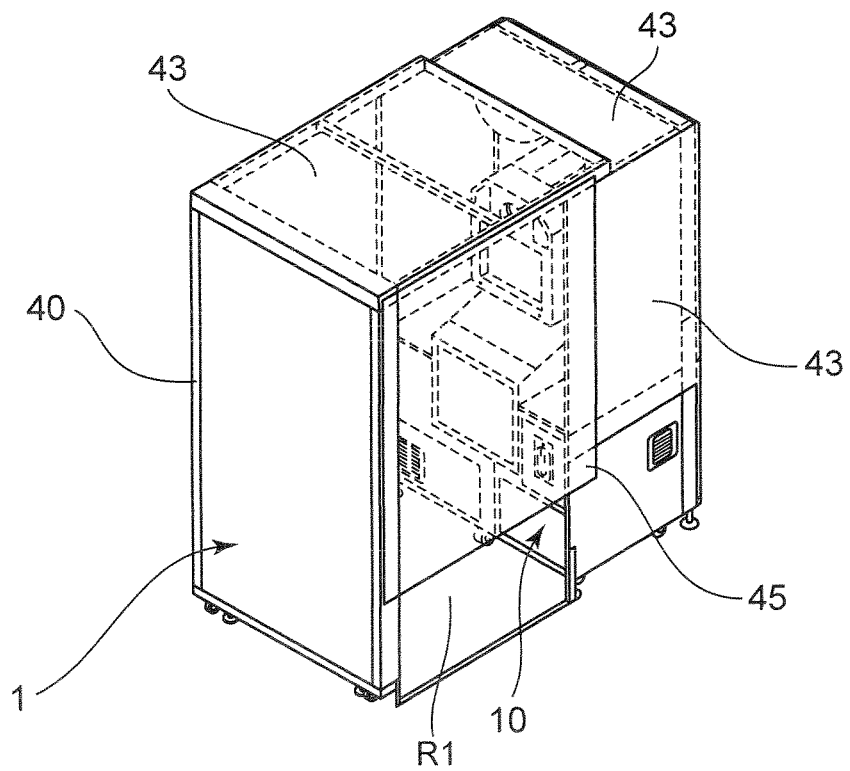
FIG. 1B is a perspective view of a photo sticker creating apparatus according to one embodiment of the present invention.

FIGS. 1A and 1B are diagrams respectively showing an appearance of a photo sticker creating apparatus according to one embodiment of the present invention. As shown in FIG. 1A, the photo sticker creating apparatus 1 of an image processing apparatus is made up of a photographing unit 10 for photographing and editing and a background unit 40 for controlling a background during photographing. A space between the photographing unit 10 and the background unit 40 constitutes a photographing space R1 in which a user performs a photographing.

When disposed and used in a game arcade etc., as shown in FIG. 1B, the photo sticker creating apparatus 1 is disposed in such a state that a portion of an upper portion and a side portion of the photo sticker creating apparatus 1 is covered with a shielding sheet 43. Further, the photo sticker creating apparatus 1 is disposed in such a state that an opening portion (entrance/exit for a user) between the photographing unit 10 and the background unit 40 is covered with a curtain 45 on a lateral side. In this way, the space inside the photo sticker creating apparatus 1 (the photographing space R1) is shielded from the outside by the curtain 45. This allows a user to photograph an image in the photographing space R1 without caring about people's eyes on the outside. On the other hand, the curtain 45 does not cover the lower portion of the opening portion (entrance/exit) on the lateral side of the photo sticker creating apparatus 1, and therefore, the photographing space R1 is prevented from being completely closed for security reasons. The curtain 45 and the shielding sheet 43 are printed with an image for advertisement, information on procedures of the game of the photo sticker creating apparatus 1, and the like.

Figure 2A:
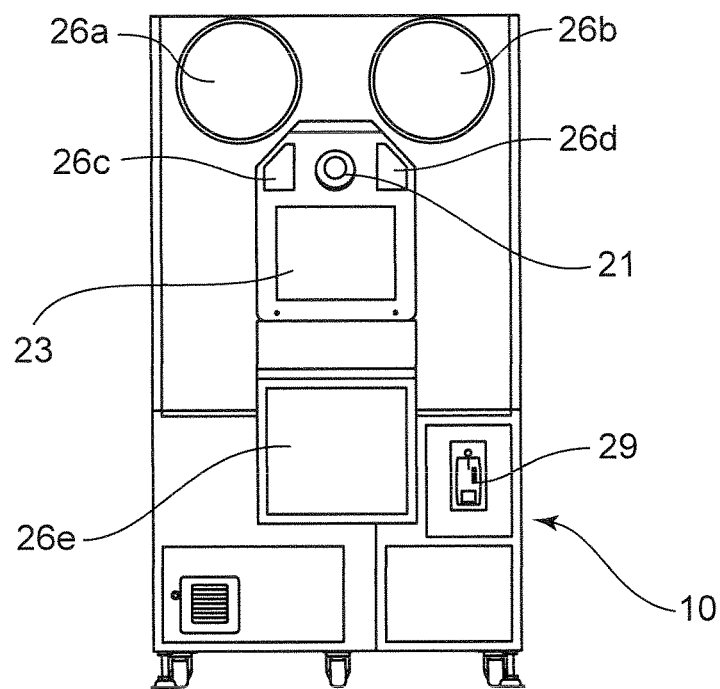
FIG. 2A is a front view of the photo sticker creating apparatus.
Figure 2B:
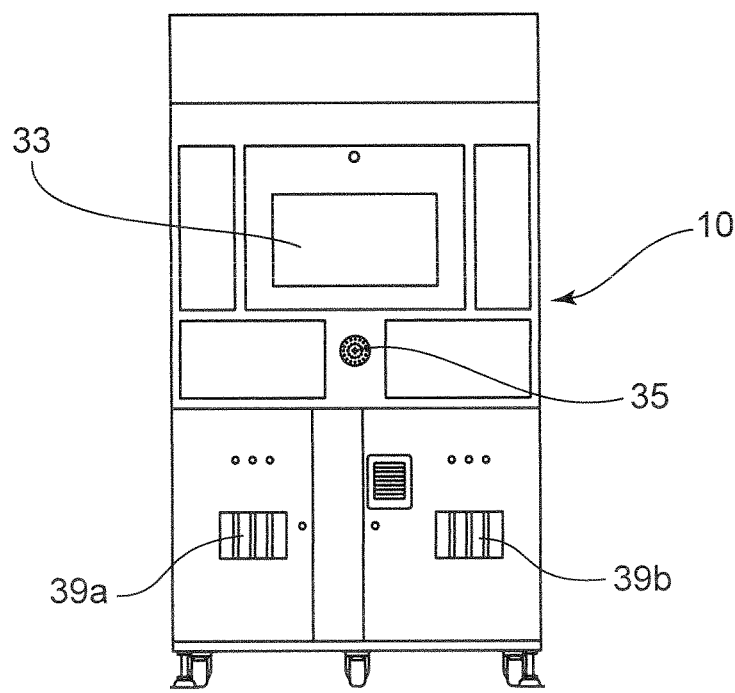
FIG. 2B is a rear view of the photo sticker creating apparatus.

FIGS. 2A and 2B show a front view and a rear view, respectively, of the photographing unit 10. As shown in FIG. 2A, a front face of the photographing unit 10 is disposed with a camera 21, illumination apparatuses 26a to 26e, a touch panel monitor 23, and a coin insert/return slot 29. It is noted that a bill/credit-card reader or a money changer may be disposed instead of the coin insert/return slot.

The camera 21 photographs an image of an object (user) to generate a photographed image. The camera 21 is made up of an imaging element such as a CCD (charge-coupled device) or CMOS (complementary metal oxide semiconductor) image sensor. The camera 21 is not limited to the example shown in FIG. 2 in terms of the position and the number of the camera 21

The touch panel monitor 23 displays guidance, a demonstration screen, etc. of the photo sticker creating game and a game method thereof. The touch panel monitor 23 accepts an instruction from a user through a touch operation. The touch panel monitor 23 is made up of an LCD (liquid crystal display), an organic EL display, etc. A colorless and transparent touch sensor (e.g., of a pressure-sensitive or electromagnetic induction type) is superimposed on a screen of the touch panel monitor 23 and positional information (instruction from a user) can be input by touching with, for example, a stylus pen or a user's finger. The touch panel monitor 23 displays a background image selection screen that is a GUI for selecting an image of background and/or foreground (composition image) to be composited with the photographed image generated by the camera 21.

The illumination apparatuses 26a to 26e are apparatuses for irradiating an object with illumination light during photographing of an image of the object. The illumination apparatuses 26a to 26e are made up of a fluorescent light, a LED (light emitting diode) illumination device, an illumination device capable of stroboscopic light emission, etc.

The coin insert/return slot 29 is an opening portion for allowing a user to input a charge for the photo sticker creating game and to receive the change etc. A side surface of the photographing unit 10 is disposed with a speaker (not shown) for outputting a guidance sound, a sound effect, etc. to a user in the photographing space R1.

As shown in FIG. 2B, the rear face of the photographing unit 10 is disposed with a tablet built-in monitor 33, a speaker 35, and sticker discharge ports 39a, 39b.

The tablet built-in monitor 33 displays an edit screen that is a GUI (graphical user interface) for editing a photographed image generated by a photographing operation in the photographing space R1. The edit screen is formed to concurrently display two images to be edited so that a pair of users uses respective stylus pens to separately edit graffiti. The two concurrently displayed images targeted for the graffiti editing may be the same images or different images.

The tablet built-in monitor 33 is made up of a tablet to which positional information can be input with a stylus pen, and a monitor having a display device capable of displaying an image. The tablet is, for example, a pressure-sensitive or electromagnetic induction type input device (touch sensor), is colorless and transparent, and is superimposed and disposed on a display screen of the display device. The display device is made up of an LCD (liquid crystal display), an organic EL display, etc. Therefore, the tablet built-in monitor 33 not only simply displays a GUI image etc. by the display device but also accepts an input operation from a user by the tablet. The tablet built-in monitor 33 may include a touch panel monitor and may allow the user to input information with a finger etc.

The speaker 35 outputs sounds such as a guidance sound, a sound effect, and BGM related to an edit operation of the photo sticker creating game. It is noted that the number, design, shape, and the like of the disposed speakers 35 are arbitrary.

The sticker discharge ports 39a, 39b discharge a photo sticker generated by reflecting the selection made in the photographing space R1 and details of editing performed in an editing space R2 based on the photographed image photographed in the photographing space R1.

1.2. Internal Configurations

Figure 3:
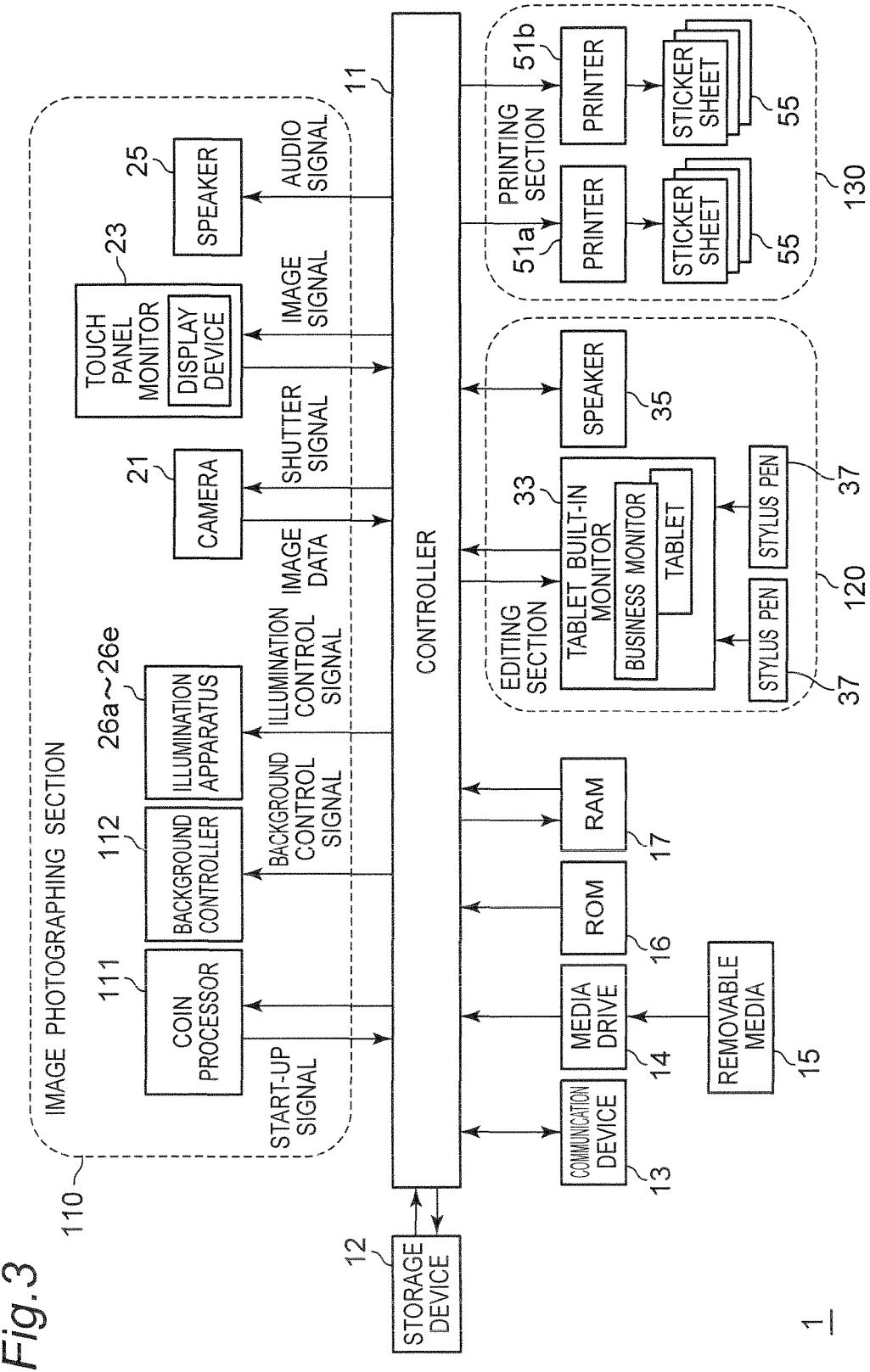
FIG. 3 is a diagram showing internal constitutes of the photo sticker creating apparatus.

Internal configurations of the photo sticker creating apparatus 1 will be described below. FIG. 3 is a block diagram showing one example of a functional configuration of the photo sticker creating apparatus 1. The same constituent elements as the constituent elements described above are denoted by the same reference numerals and will not be described.

As shown in FIG. 3, the photo sticker creating apparatus 1 has a controller (processor) 11 for controlling an overall operation of the photo sticker creating apparatus 1. The controller 11 is respectively connected via a predetermined bus to a storage device 12, a communication device 13, a media drive 14, a ROM (read only memory) 16, a RAM (random access memory) 17, an image photographing section 110, an editing section 12, and a printing section 130. The controller 11 is made up of a CPU or an MPU and executes a predetermined program to implement general functions of the photo sticker creating apparatus 1 including functions described below. The predetermined program may be installed in the photo sticker creating apparatus directly or through a communication line from a predetermined recording medium. The predetermined recording medium includes, for example, magnetic disks such as a hard disk drive (HDD), a solid state drive (SSD), and a floppy (registered trademark) disk, optical disks such as CD (compact disc), DVD (digital versatile disc), and BD (Blu-ray disc) (registered trademark), magnetic optical discs such as MD (mini disc) (registered trade mark), or a removable medium such as a memory card. It is noted that the controller 11 may be designed as a dedicated electronic circuit for implementing a predetermined function. That is, the controller 11 may be made up of CPU, MPU, DSP, FPGA, ASIC, or ASSP.

The storage device 12 includes a non-volatile storage medium such as a hard disk drive (HDD), a flash memory, and a solid state drive (SSD). The storage device 12 stores various pieces of configuration information and reads and supplies the stored configuration information to the controller 11. The recording medium making up the storage device 12 may be any non-volatile recording medium.

The communication device 13 communicates with another communicating device (not shown) through an external network (not shown) such as the internet and a public telephone network, for example, or simply through a communication cable (not shown). That is, the communication device 13 communicates with another communication device such as a user's portable telephone, a user's personal computer, or central management server under the control of the controller 11. For example, the communication device 13 transmits transmission information supplied from the controller 11 to another communication apparatus and supplies reception information supplied from another communication apparatus to the controller 11.

The media drive 14 is loaded with a removable medium 15 such as a magnetic disk (including a flexible disk), an optical disk (such as CD, DVD, and BD), a magnetic optical disk, or a semiconductor memory. A computer program and data are read from the removable medium 15 and supplied to the controller 11 or stored or installed in the storage device 12 etc.

The ROM 16 preliminarily stores the program and data executed by the controller 11. The ROM 16 supplies the program and data to the controller 11 based on an instruction of the controller 11. The RAM 17 temporarily keeps the data and program executed by the controller 11.

The image photographing section 110 is a block related to a photographing process and has a coin processor 111, a background control portion 112, the illumination apparatuses 26a to 26e, the camera 21, the touch panel monitor 23, and a speaker 25.

The camera 21 captures a moving image for live-view display before photographing and outputs the image data of the captured moving image to the controller 11. The camera 21 outputs to the controller 11 the image data acquired by photographing, which is performed based on an instruction from a user of an object. In this case, when receiving the image data from the camera 21, the controller 11 generates an image signal based on the received image data and outputs the image signal to the touch panel monitor 23.

When receiving the image signal from the controller 11, the touch panel monitor 23 displays on a display device a still image or a moving image (live view) of the photographed object based on the received image signal.

The coin processor 111 counts coins inserted from the coin insert/return slot 29 and transmits a signal indicative of a counted amount to the controller 11. The controller 11 determines whether coins are inserted in a predetermined amount based on the signal from the coin processor 111. The background control portion 112 controls a background curtain hung as a background behind an object (on the background unit side) in the photographing space R1. That is, the background control portion 112 hangs and houses the background curtain under the control of the controller 11. It is noted that the background unit 40 may have structure with a chroma-key composition curtain affixed to a sheet metal. Alternatively, the background unit 40 may be made up only of a sheet metal painted in predetermined color (e.g., green). The color of the sheet metal may be color such as white matched to a background image. In case that hanging/housing the background curtain does not have to be controlled in the background unit 40, the background control portion 112 may not be included.

An editing section 120 is a block related to an edit process, and includes the tablet built-in monitor 33, a stylus pen 37, and the speaker 35.

The printing section 130 includes two printers 51a and 51b for printing a result of edit operation performed by the editing section 120 on a sticker sheet 55. Hereinafter, the printer 51a disposed on the left side viewed from the rear side of the photo sticker creating apparatus 1 will be referred to as a "first printer" and the printer 51a disposed on the right side will be referred to as a "second printer." Only one printer is operated between the first printer 51a and the second printer 51b. The other printer is secondarily used instead of the printer in operation when sticker sheets run out in the printer in operation or when the printer in operation fails. The first and second printers 51a and 51b acquire image information edited by the controller 11 for printing on the sticker sheet 55. When completing a printing process, the first and second printers 51a and 51b discharge the printed sticker sheet 55 from the sticker discharge ports 39*a*, 39*b*. This printed sticker sheet 55 is provided to a user as a photo sticker that is a resulting product of the photo sticker creating game.

2. Operation of Photo Sticker Creating Apparatus 2.1. Flow of Photo Sticker Creating Game A flow of a photo sticker creating game by the photo sticker creating apparatus 1 and user's movement associated therewith will be described with reference to FIG. 4.

Figure 4:
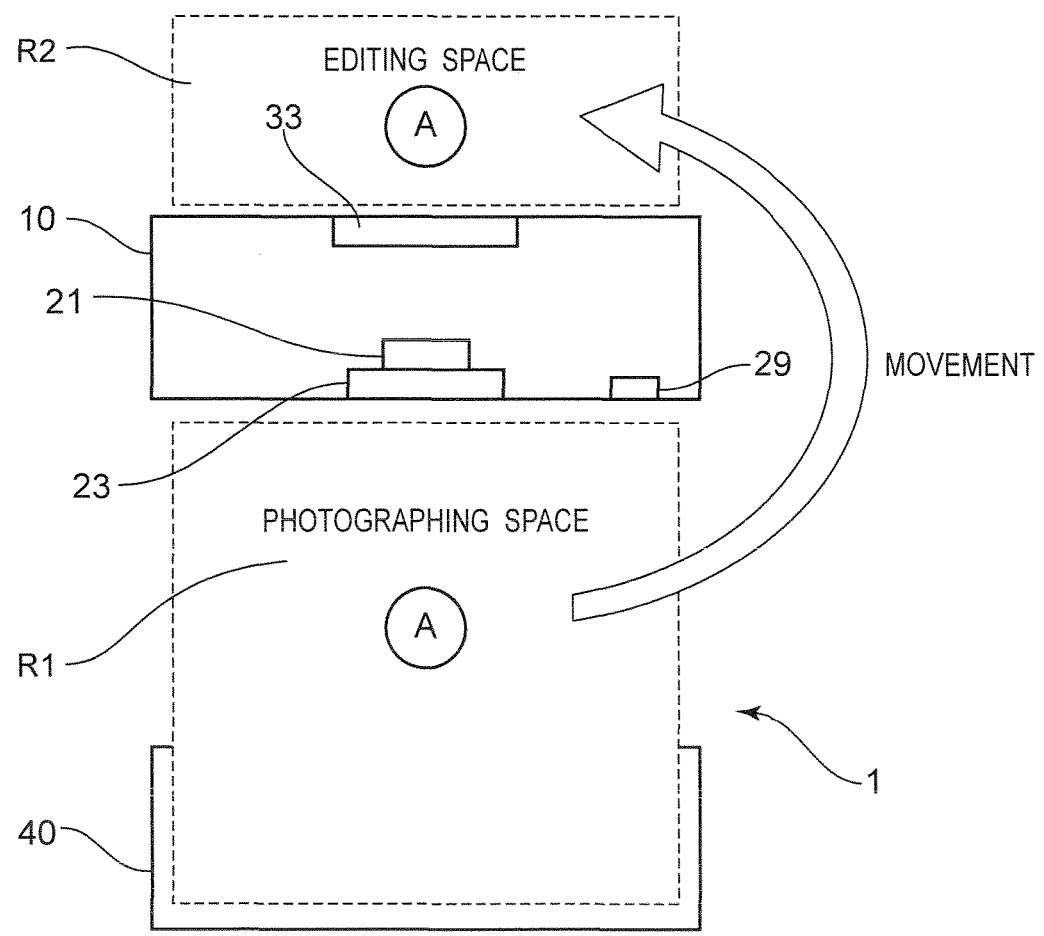
FIG. 4 is a diagram for explaining user's spatial movement during a photo sticker creating game.

FIG. 4 is a diagram for explaining user's spatial movement during the game. FIG. 4 shows a view when the photo sticker creating apparatus 1 is viewed in its entirety from above. As shown in FIG. 4, a user A enters the photographing space R1 from a lateral side of the photo sticker creating apparatus 1 and puts the charge into the coin insert/return slot 29 of the photographing unit 10 to start the photo sticker creating game. Subsequently, the user A selects a background image and photographs and image with the camera 21 in the photographing space R1. That is, in the photographing space R1, the user A utilizes the camera 21 and the touch panel monitor 23 disposed in the front face of the photographing unit 10 to select the background image to be composited with a photographed image and to photograph an image of the user A and the like (the photographing operation).

When completing the selection of the background image and the photographing, the user A moves to the editing space R2 located behind the photographing unit 10 in accordance with guidance (leading) of the photo sticker creating apparatus 1. The user A operates the tablet built-in monitor 33 to perform an edit operation such as writing graffiti on the photographed image in the editing space R2. It is noted that, If a user of the preceding group is using the editing space R2 (performing the edit operation) when the selection of the background image and the photographing are completed in the photographing space R1, the photo sticker creating apparatus 1 does not guide the user A to the editing space R2. In this case, the user A waits in the photographing space R1 until the editing space R2 becomes available. Subsequently, when the user of the preceding group terminates the edit operation, the photo sticker creating apparatus 1 guides the user A to the editing space R2 and the user A moves to the editing space R2 in accordance with the guidance. When it is determined that operations are concurrently performed in the photographing space R1 and the editing space R2, the photo sticker creating apparatus 1 may control the photographing process such that a photographing time becomes longer in the photographing space R1 or may control the edit process such that an edit time becomes shorter in the editing space R2, so as to reduce the waiting time of the user.

As described above, it is possible to separate the photographing space R1 for photographing and the editing space R2 for editing an image, and therefore, it is possible to guide different users to the respective spaces. Therefore, two groups of users can enjoy games at the same time in the one photo sticker creating apparatus 1. Thus, as compared to the case where the photographing and editing are performed in one space, it is possible to increase a rate of operation of the photo sticker creating apparatus 1.

It is noted that, in the example described above, the photographing and the selection of the background image are performed in the photographing space R1 and the graffiti process and the printing process are executed in the editing space R2. However, a photo sticker apparatus may be configured such that the photographing, the selection of the background image, the graffiti edit, and the printing are performed in respective different spaces. In case that a plurality of processes is executed in one space as described above, although the photo sticker creating apparatus 1 can advantageously be reduced in size to make a footprint smaller, even when respective different groups of users concurrently perform operations in the respective spaces, only the two spaces are available for operations and, therefore, the number of groups of users capable of concurrently using the apparatus sets to be at most two. However, in case that the processes are executed in respective different spaces, it is possible to increase the number of users concurrently using the apparatus, and to improve a turnover rate. On the other hand, the footprint of the photo sticker creating apparatus 1 becomes relatively larger, and therefore, a disposition location must have a relatively large area.

The configuration of units of the photo sticker creating apparatus 1 is arbitrary and a unit configuration other than the described configuration may be used. A method of serving to multiple customers is arbitrary. For example, one photographing space and two editing spaces may be disposed. This configuration can improve the turnover rate of the photo sticker creating apparatus. Alternatively, two photographing spaces and two editing spaces may be disposed, respectively. In this case, since two (i.e., multiple) spaces are disposed for each of the photographing and the editing, it is possible to further improve the turnover rate of the photo sticker creating apparatus.

2.2. Overall Operation

Figure 5:
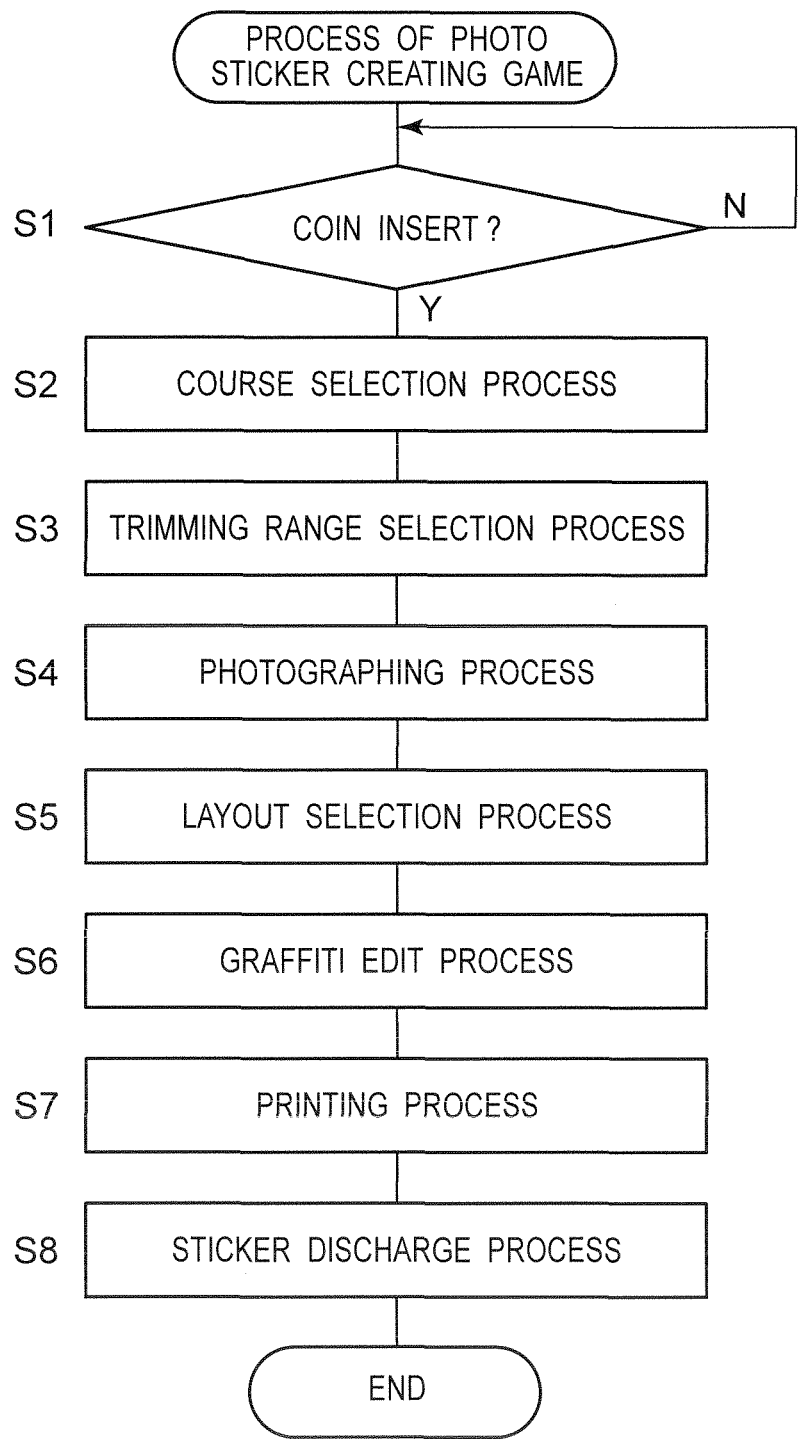
FIG. 5 is a flowchart showing a series of operations related to the photo sticker creating game by the photo sticker creating apparatus 1.

An operation related to the photo sticker creating game of the photo sticker creating apparatus 1 will be described. As described above, the photo sticker creating apparatus 1 composites a foreground or a background with a user's photographed image, and prints and outputs the image subjected to an edit process such as writing graffiti on a sticker sheet. FIG. 5 is a flowchart showing a series of operations related to the photo sticker creating game in the photo sticker creating apparatus 1. An overall operation of the photo sticker creating apparatus 1 will be described below with reference to the flowchart of FIG. 5.

When a user puts coins into the coin insert/return slot 29 in a predetermined amount required for playing the game in the photo sticker creating apparatus 1 (S1), the controller 11 starts the photo sticker creating game. It is noted that, among processes described below, a course selection process (S2), a trimming range selection process (S3), a photographing process (S4), and a layout selection process (S5) are executed for a user present in the photographing space R1. A graffiti edit process (S6), a printing process (S7), and a sticker discharge process (S8) are executed for a user present in the editing space R2.

First, the controller 11 executes the course selection process (S2). In the present embodiment, one course can be selected from a plurality of courses. In the present embodiment, for example, a "normal course" and an "easy course" are prepared. The easy course is a course intended for a user unfamiliar with the operation of the photo sticker creating apparatus 1 and is a course in which the user can proceed with the game through an operation simpler than the normal course. The controller 11 displays a course selection screen for allowing the user to select a course of the game on the touch panel monitor 23 of the image photographing section 110. The user operates the touch panel monitor 23 on the course selection screen to select a desired course. The controller 11 stores the information of the course selected by the user in the RAM 17.

After termination of the course selection process (S2), the controller 11 executes the trimming range selection process (S3). In the trimming range selection process, a range of a photographed image is selected based on a desired trimming range out of a plurality of trimming ranges set in advance for the photographed image based on an instruction from a user. The trimming range selection process (S3) will be described below in detail.

After termination of the trimming range selection process (S3), the controller 11 executes the photographing process (S4). In the photographing process, the controller 11 controls the portions of the image photographing section 110 to take an image (photograph) of the user (object). In this case, a plurality of images (photographs) of the user (object) is taken in series. This enables the user to photograph images in various poses. The number of photographed images may be the same as the number of arrangement regions of the images printed on a photo sticker. Alternatively, the number of photographed images may be made larger than the number of arrangement regions of the images printed on a photo sticker so that the user selects an image printed on a photo sticker out of the photographed images. The trimming range selection process will be described below in detail.

After termination of the photographing process (S4), the controller 11 displays a guidance screen for guiding the user to the editing space R2 on the touch panel monitor 23. The user moves to the editing space R2 in accordance with the display of the guidance screen displayed on the touch panel monitor 23 and subsequently performs an operation in the editing space R2. After termination of the photographing process (S4), the controller 11 further executes the layout selection process (S5). It is noted that the layout selection process (S5) may be executed in the photographing space R1.

The layout selection process is a process of determining a layout of a photo sticker. A plurality of photo sticker layouts is prepared in the photo sticker creating apparatus 1 so that a user selects a desired layout from a plurality of the layouts.

After termination of the layout selection process (S5), the controller 11 executes the graffiti edit process (S6). The graffiti edit process is a process of accepting decoration to a photographed image by a user. Concretely, the user can operate the stylus pen 37 on the tablet built-in monitor 33 disposed on the rear face of the photographing unit 10 in the editing space R2 so as to write graffiti (desired characters, graphics, drawings) on a photographed image. In addition, the user can operate the stylus pen 37 on the tablet built-in monitor 33 to give an instruction for pasting a decoration image (a predetermined drawing pattern, a predetermined text, and a combination thereof) prepared in advance to the photographed image onto a desired region of the photographed image. In the graffiti edit process, the controller 11 accepts an instruction relate to a graffiti writing operation and a decoration image from a user and composites the line image generated by writing graffiti or the decoration image of the instruction with the photographed image. This graffiti process enables a user to create a photo sticker of favorite design. It is noted that, although the operation is performed by using the stylus pen 37 in the above description, the operation may be performed by using a finger.

It is noted that the contents of the graffiti edit operation provided to a user in the graffiti edit process differs depending on a course selected by the user at the start of the game. For example, since the easy course is intended for a user unfamiliar with the photo sticker creating game, a procedure of operation of writing graffiti is made easier or the number of types of selectable operations is reduced as compared to the normal course. On the other hand, more various and complicated functions are provided to a user in the normal course as compared to the easy course so that the user can more elaborately write desired graffiti.

After termination of the graffiti edit process (S6), the controller 11 executes the printing process (S7) and the sticker discharge process (S8). In the printing process, the controller 11 edits an image for print based on the background or foreground image composited with the photographed image acquired from the trimming range selected in the trimming range selection process (S3), the layout selected in the layout selection process (S5), and the contents of the graffiti and decoration image of the instruction given in the graffiti edit process (S6). The controller 11 controls the printers 51a and 51b in the printing section 130 to print the edited image on the sticker sheet 55. After the printing is completed, the sticker sheet 55 printed with the edited image is discharged from either of the sticker discharge ports 39a, 39b. In a post customer process corresponding to a waiting time of the printing process, the controller 11 prompts the user to enter an e-mail address or an ID for SNS and transmits the image data edited for print or an image after trimming through the communication device 13 to an external server. The user can download the image data from the server to a smartphone etc., of the user to enjoy the image data.

As a result of the procedures as described above, a photo sticker is generated that includes an image acquired by applying desired decoration to a user's image.

2.3. Trimming Range Selection Process

An operation of the trimming range selection process (step S3 in the flowchart of FIG. 5) will be described below in detail. In the trimming range selection process, a desired trimming range is selected out of a plurality of trimming ranges set in advance for the photographed image based on an instruction from a user.

Figure 6:
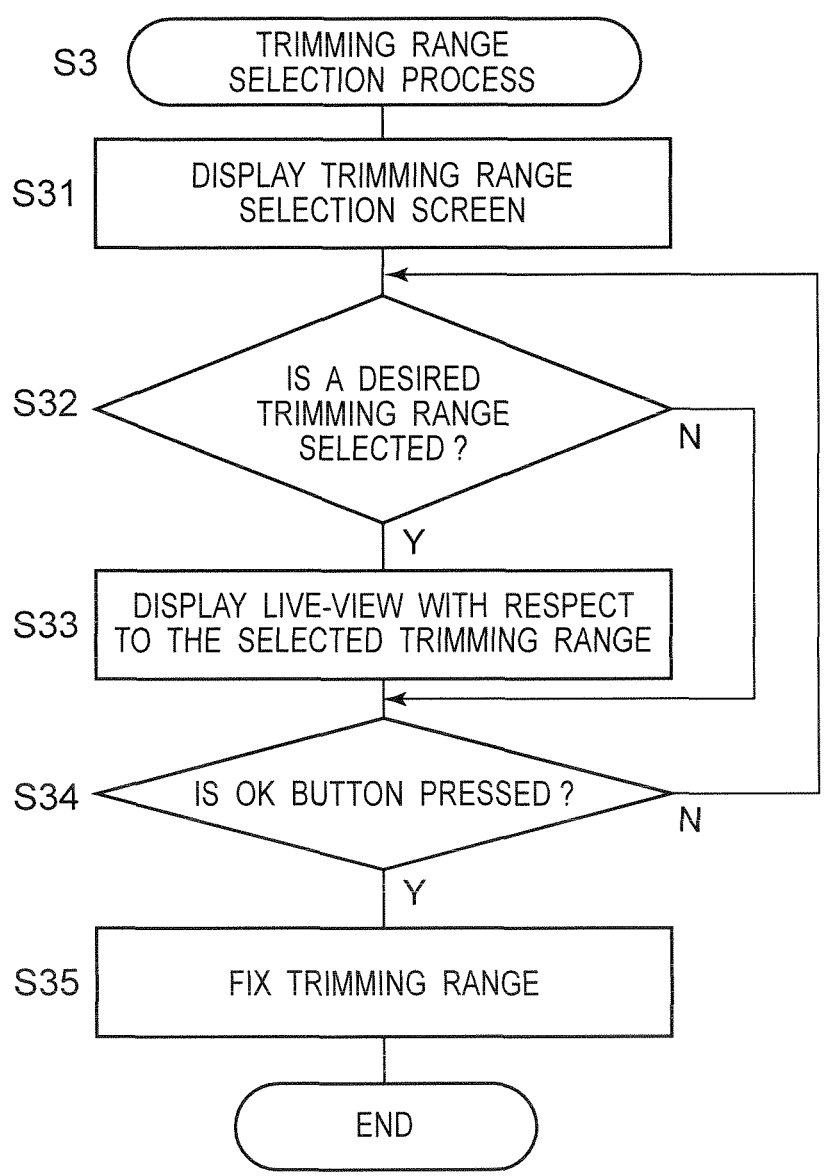
FIG. 6 is a flowchart showing a process of a controller 11 in a trimming range selection process.

FIG. 6 is a flowchart showing a process of the controller 11 in the trimming range selection process. In the trimming range selection process, the controller 11 first displays a trimming range selection screen for allowing a user to select a trimming range on the touch panel monitor 23 (S31).

Figure 7:
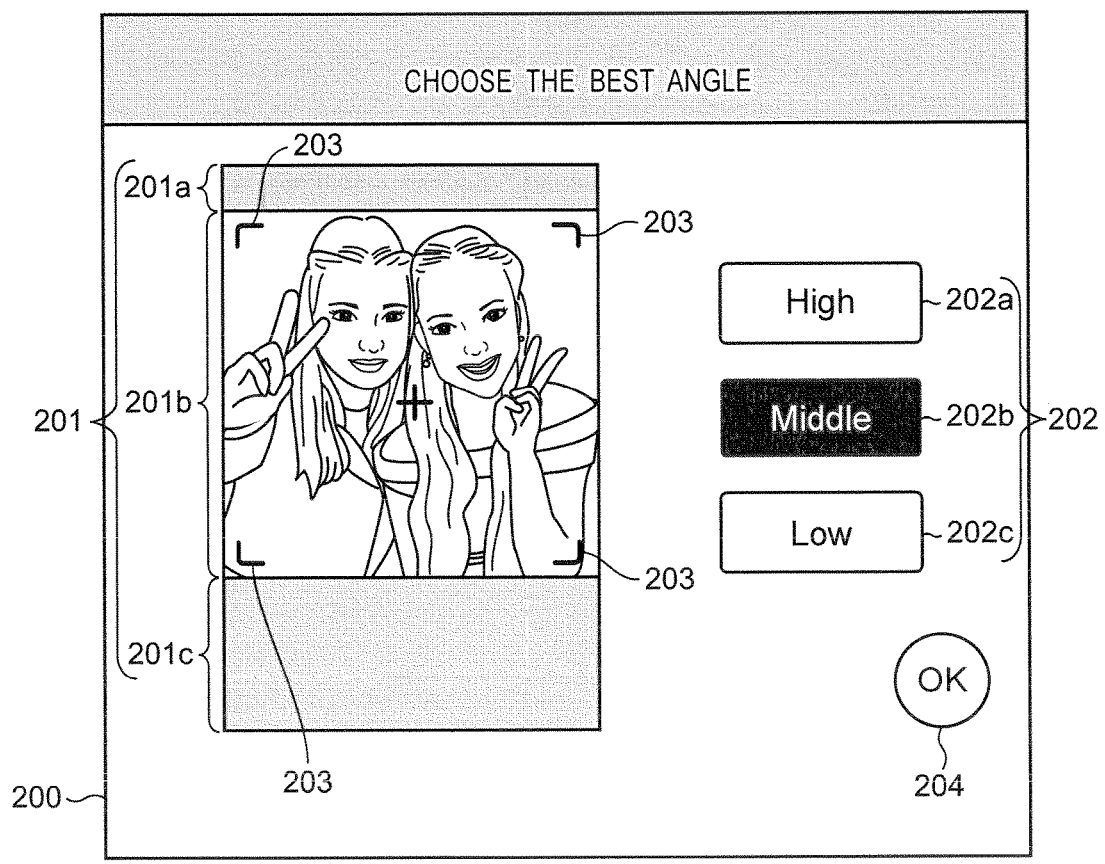
FIG. 7 is a diagram showing one example of a trimming range selection screen displayed first in the trimming range selection process.

FIG. 7 is a diagram showing one example of the trimming range selection screen displayed first in the trimming range selection process. In a trimming range selection screen 200, a user can select a trimming range. The trimming range selection screen 200 displays a live-view screen 201, trimming range selection buttons 202, a frame 203 in which an object is considered as being at a best position, and an OK button 204. In this case, the frame 203 is displayed in a target frame 201b that is a range cut out from a photographed image by trimming. In addition, the live-view screen 201 displays a video of users in the photographing space R1 taken in real time by the camera 21. In addition, in the live-view screen 201, ranges (trimming ranges) 201a, 201c cut out by trimming are displayed in gray. These ranges 201a, 201c displayed in gray are ranges not used as the photographed image. This configuration facilitates a user to form an impression of an image after trimming. The user selects the trimming range before photographing a first image and this selected trimming range is applied to all the subsequent photographing. It is noted that, although the ranges (trimming ranges) cut out by trimming are displayed in gray in the present embodiment, a video or a frame may be displayed without displaying in gray. In addition, the trimming ranges may be displayed by any other means as long as a user can understand.

As shown in FIG. 7, the trimming range can be selected in three stages by a high (H) button 202a, a middle (M) button 202b, and a low (L) button 202c. Therefore, the user can select a trimming range appropriate for the user's height from the three stages and can photograph. The user can press any of the high button 202a, the middle button 202b, and the low button 202c on the trimming range selection screen 200 to intuitively confirm how the object looks in the desired trimming range. FIG. 7 shows the live-view screen 201 in a photographing range when the user selects the middle button 202b. When the user confirms the best-looking photographing range, the user presses (touches) the OK button. As a result, the trimming range is determined.

Figure 8:
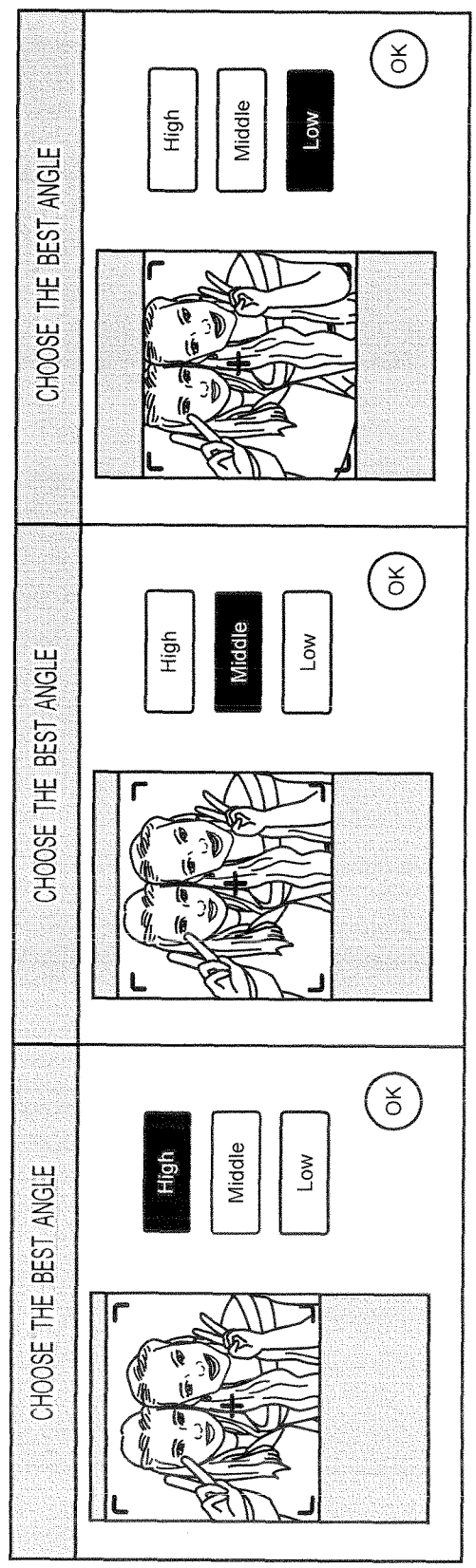
FIG. 8 is a comparison diagram for explaining a three-stage trimming range.

FIG. 8 is a comparison diagram for explaining the three-stage trimming range. FIG. 8 shows the live-view screen 201 when the user presses the high button 202a on the leftmost side, the live-view screen 201 when the user presses the middle button 202a in the center, and the live-view screen 201 when the user presses the low button 202c on the rightmost side. The trimming range can be switched in this way by the buttons 202a to 202c. In this example, a better composition can be achieved by selecting the high button 202a.

FIG. 9 shows a table for explaining a relation between an upper limit value of the trimming range and an upper limit value of the height of the actual object. FIG. 10 is a diagram for explaining the relation between an upper limit value of the trimming range and an upper limit value of the height of the actual object of FIG. 9. In this case, the relation between an upper limit value of the trimming range and an upper limit value of the range of the actual object is set for each of countries and is described by taking USA and Japan as an example in FIGS. 9 and 10.

As shown in FIG. 9, the trimming range and the position of the object are correlated and stored as a table in the storage device 12, and switching to either setting can be made at the time of maintenance to switch the correlation between the trimming range and the range of objects corresponding to the range. In this case, since it is assumed that the average height of the Americans is higher than that of the Japanese, a value (an upper limit value) of each stage in USA is set to a higher value than a value (an upper limit value) of each stage in Japan. As shown in FIG. 10, in a range photographed by the camera 21 (0 to 190 cm), a predetermined range defined by using a value shown in FIG. 9 as an upper limit is set as the trimming range (a photographing range from the viewpoint of a user). For example, in the case of the setting in USA, a predetermined range defined by using the height of 185 cm as the upper limit is set as a high trimming range. The same applies to the following.

With this configuration, the height of the trimming range can be adjusted depending on a country even when an average height is different in each of countries. That is, when the Americans having the average height higher than the Japanese takes a photograph, an image can be photographed in a good composition without stooping (without being in a half-sitting posture) in the photographing space R1.

Further, users in Japan are mainly junior and senior high school girls and many users are short in height, while it is assumed that users of various heights use the apparatus in USA regardless of age or gender. Even in such a case, the height of the trimming range can be adjusted to cover all the height for each game, and therefore, it is possible to photograph an image in a good composition for each game.

It is noted that, although the height of the trimming range is adjusted in three stages, the height may be set in four or more multiple stages. In this case, a user can more easily select a better composition. In addition, in the present embodiment, the controller 11 provides control such that a user selects the trimming range in a predetermined stage while viewing the live-view screen. However, the controller 11 may provide control such that the trimming range is continuously variably displayed. In this case, the current trimming range is displayed by a predetermined thick frame (anchor display).

Returning to the flowchart of FIG. 6, at step S32, the controller 11 determines whether the desired trimming range is selected by the user. If it is determined that the desired trimming range is selected by the user (YES at S32), the controller 11 displays a live view (a photographed image that is a moving image) corresponding to the selected trimming range on the touch panel monitor 23 and determines whether the OK button is pressed by the user (S34). In addition, if the desired trimming range is not selected by the user (NO at S32), the process proceeds to step S34 as described above. If the OK button 204 is pressed at step S34 (YES at S34), the controller 11 fixes the selected trimming range (S35) and this process is terminated. On the other hand, if the OK button is not pressed at step S34 (NO at S34), the controller 11 returns to the process of step S32 and repeats the processes of steps S32 to S34.

2.3.1. Modified Embodiments of Trimming Range Selection Process

The trimming range selection process in the photo sticker creating apparatus 1 of this embodiment is not limited to the above example. Several other examples of the trimming range selection process will be exemplarily described.

(a) First Modified Embodiment

Figure 11:
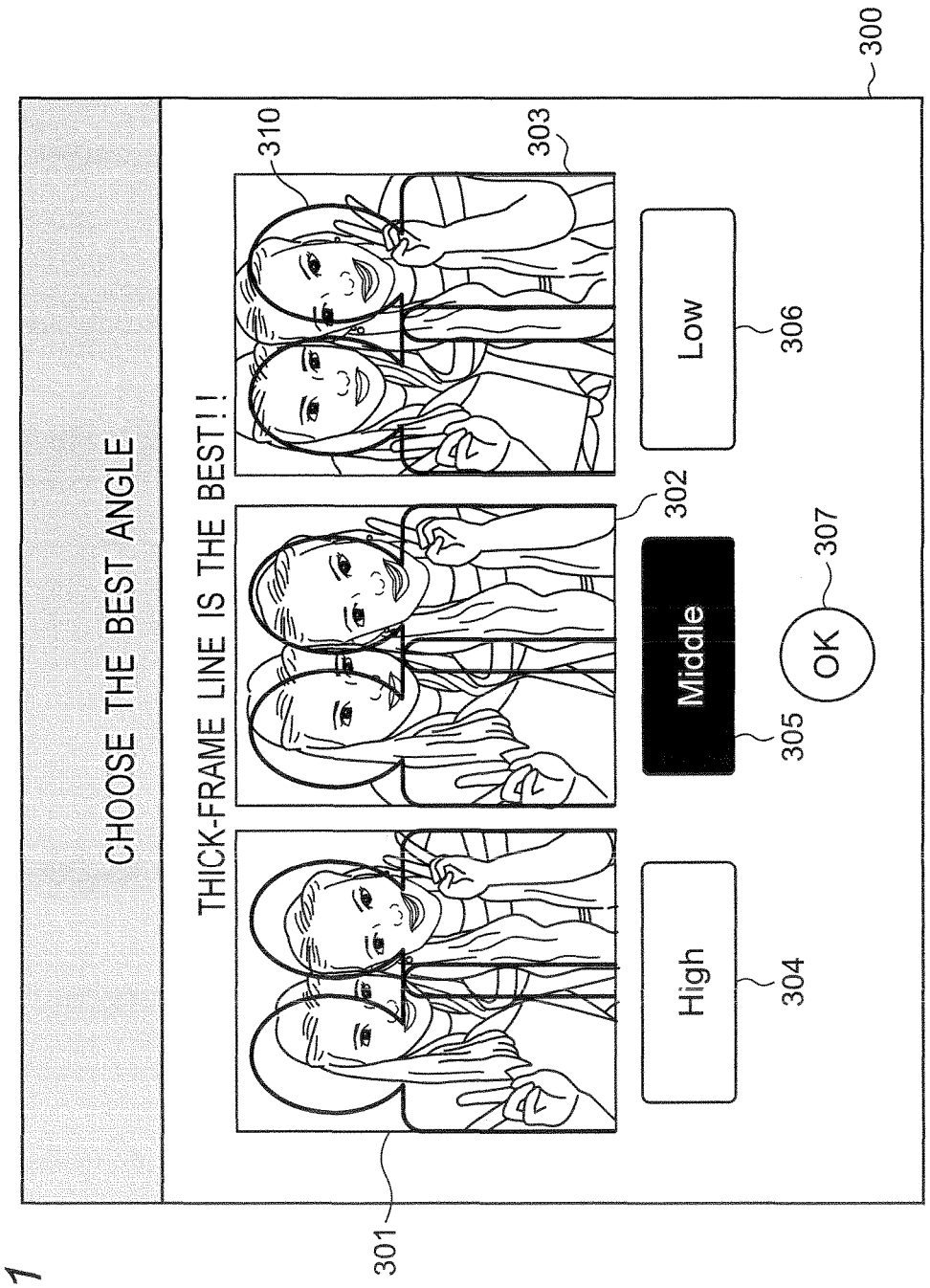
FIG. 11 is a diagram showing one example of a trimming range selection screen displayed first in the trimming range selection process.

In the embodiments as described above, although the user switches the selection buttons 202 on the one live-view screen 201 on the trimming range selection screen 200 shown in FIG. 7 to intuitively select the best angle of view, the trimming range selection screen is not limited thereto. For example, as shown in FIG. 11, live-views for all the trimming ranges may be displayed at the same time on a trimming range selection screen 300. In FIG. 11, a live-view screen 301, a live-view screen 302, and a live-view screen 303 correspond to a high button 304, a middle button 305, and a low button 306, respectively. In addition, each of the live-view screens 301 to 303 displays a best position as a thick-frame line (person frame) 310 corresponding to the number of users, and the users can select a best composition by reference to this thick-frame line. In this case, the thick-frame line 310 forms a frame indicative of positions of users and, if the users determine the middle composition is best, the users select the middle button 305 and press an OK button 307.

This configuration enables a user to select a best composition while visually comparing selectable trimming selection ranges on one screen at one time. In addition, since the person frame corresponding to the number of users is displayed, the users can more properly be guided to positions in accordance with the number of the users.

It is noted that, although a video cut out by trimming is displayed on each of the live-view screens 301 to 303, a range cut out by trimming may be displayed in gray as is the case with the embodiment described above. In addition, the thick-frame line 310 may be changed depending on a value of focal distance (zooming) such as close-up and a whole body.

(b) Second Modified Embodiment

In the embodiment described above, after a trimming range is selected before photographing a first image, the selected trimming range is applied to all the remaining photographing. However, the trimming range may be selected at the following timing.

The trimming range is selected before each image is photographed.

After the trimming range is selected before a first image is photographed, the trimming range is selected again when a second image is photographed, and the reselected trimming range is subsequently applied to the remaining photographing. In this case, a skip function may be included such that when trimming is selected again, the selection can be skipped. This configuration enables a user to determine whether a composition is best after the first image is photographed and to photograph second and later images in a composition closer to the best composition.

In case that the apparatus has a function of test photographing (trial photographing) before regular photographing of a user, the trimming range is selected before this test photographing. In this case, the test photographing function refers to a function of photographing an image only for checking of composition by a user (a photographed image cannot be printed, edited, or transmitted), and the image is not counted in the number of images photographed by the user. This configuration enables the user to determine whether a composition is best based on an image photographed in test photographing and to select the best composition from a first image in the actual photographing before photographing all the images. This function is extremely effective for a user unfamiliar with the operation of the photo sticker creating apparatus.

A first image is photographed with a predetermined trimming range. Before photographing a second image, a trimming range is selected by a user with reference to the composition of the photographing of the first image, and this selected trimming range is applied to the photographing of second and later images. This configuration enables the user to estimate the best trimming range based on the composition of the first image. Therefore, the second and later images can be photographed in a composition closer to the best composition.

(c) Third Modified Embodiment

Figure 12A:
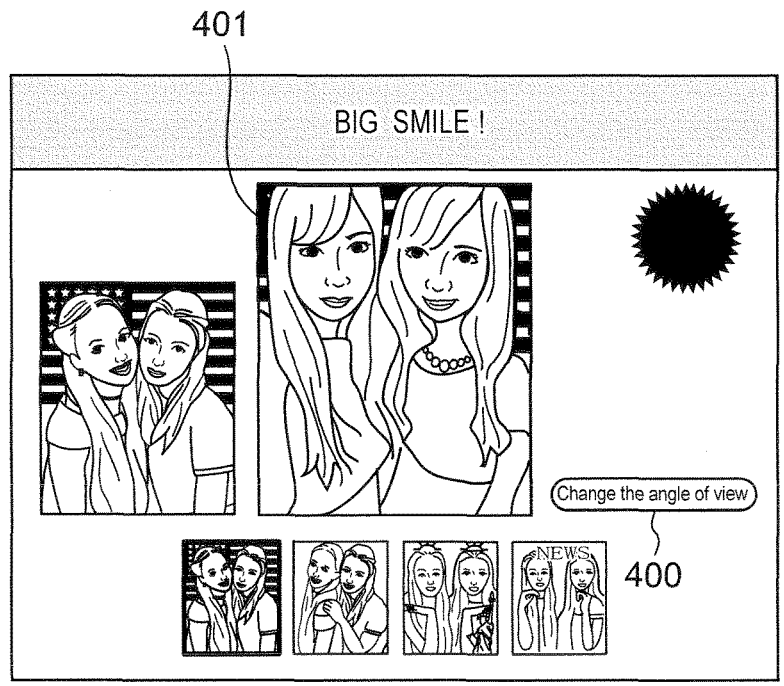
FIG. 12A is a diagram showing one example of an angle-of-view changing button.

In the embodiment described above, the once fixed trimming range cannot be changed. However, for example, the once fixed trimming range may be made selectable again. Therefore, as shown in FIG. 12A, an angle-of-view changing button 400 may be disposed in a screen for selecting the trimming range. When a user presses the angle-of-view changing button 400, the screen is switched to the trimming range selection screen 200, 300 of FIG. 7 or 11. The user can reselect the trimming range through this screen 200, 300.

Figure 12B:
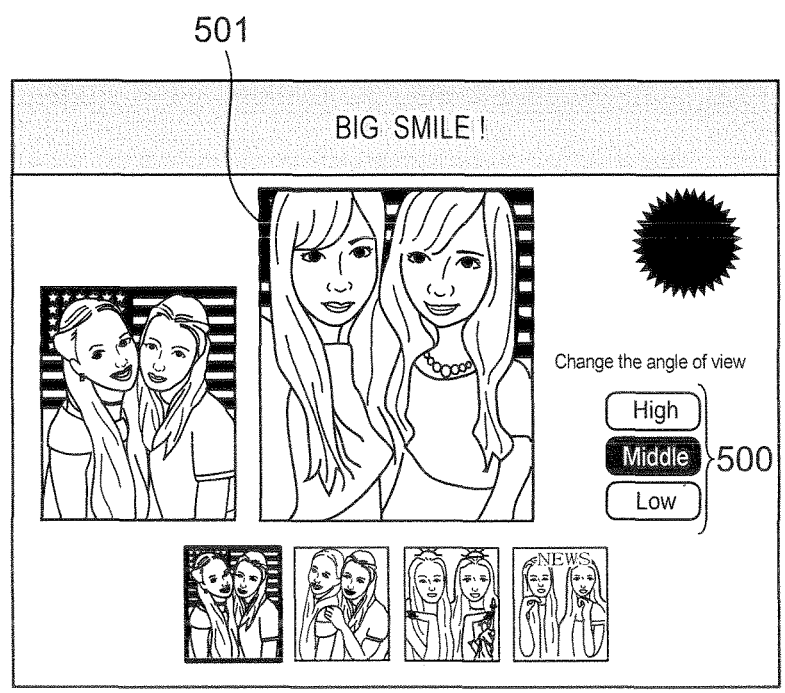
FIG. 12B is a diagram showing one example of a screen displayed when the angle-of view changing button is pressed.

Alternatively, when a user presses the angle-of-view changing button 400 of FIG. 12A, trimming range selection buttons 500 may be displayed on the screen as shown in FIG. 12B. The user may select the trimming range through these buttons 500. In this case, when the trimming range selection buttons 500 are switched, a live-view image with a trimming range switched is displayed in a live-view monitor 401.

Alternatively, when a user presses the angle-of-view changing button 400 of FIG. 12A, trimming range selection buttons 500 may be displayed on the screen as shown in FIG. 12B. The user may select the trimming range through these buttons 500. In this case, when the buttons 500 are switched, a live-view image with a trimming range switched is displayed in a live-view monitor 401.

It is noted that, although the trimming range selection buttons 500 are displayed by pressing the angle-of-view changing button 400 of FIG. 12A in the above description, the trimming range selection buttons 500 may always be displayed. In this case, when the trimming range selection buttons 500 are switched, a live-view image with a trimming range switched is displayed in a live-view monitor 501.

(d) Fourth Modified Embodiment

In the embodiment described above, although the selection of the trimming range can be selected by a user before photographing, the timing of selection of the trimming range is not limited thereto. For example, a user may be allowed to select the trimming range after or during photographing or, after a user selects the trimming range before photographing, the user may be allowed to change the trimming range again after or during photographing. Conventionally, the once fixed trimming range cannot be changed after photographing of a user or during edit of a photographed image. In contrast, the present modified embodiment is characterized in that the once fixed trimming range can be selected again on the selection screen after or during photographing.

In addition, in the embodiment described above, the direction of the camera 21 is fixed and the photographing direction is not vertically or horizontally changed. However, the direction of the camera 21 may vertically or horizontally be changed depending on a selected trimming range to switch the photographing direction.

3. Conclusion

As described above, the photo sticker creating apparatus 1 according to the present embodiment is the photo sticker creating apparatus 1 for photographing a user. The photo sticker creating apparatus 1 includes the camera 21 configured to photograph the user to generate a photographed image; a display device 11, 23 configured to display a selection screen that is a screen with which the user selects one of a plurality of trimming ranges, the trimming range being a range of trimming a part of the photographed image generated by the camera 21; an instruction receiving device 23 configured to receive selection of the trimming range on the selection screen; and a trimming processor 11 configured to perform a trimming process on the photographed image generated by the photographing device based on the trimming range selected with the instruction receiving device 23.

The user can select a trimming selection range (the photographing range from the viewpoint of a user) from a plurality of selection range candidates before photographing. As a result, the user can select a best composition for photographing without a complicated operation. A plurality of the trimming selection ranges is set in advance. As a result, when the user selects one selection range out of a plurality of the trimming selection ranges, a video corresponding to the selected photographing range is immediately displayed. Therefore, it is possible to suppress an increase in processing load with respect to the photo sticker creating apparatus, and to take an image in a short time.

OTHER EMBODIMENTS

The various ideas described in the embodiments can appropriately be combined and can appropriately be changed, replaced, added, omitted, etc., based on common general technical knowledge of those skilled in the art. Other configuration applicable to the ideas disclosed in the embodiments will be described below.

In addition, the order of the processes may appropriately be changed in the operation of the example of the photo sticker creating apparatus shown in the flowchart of FIG. 5. For example, although the trimming range selection process (S3) is executed before the photographing process (S4) in the flowchart of FIG. 5, the trimming range selection process may be executed after the photographing process. In addition, although the layout selection process (S5) is executed after the photographing process (S4), the layout selection process may be executed before the photographing process.

The ideas shown in the above embodiments are applicable to an apparatus other than the photo sticker creating apparatus. That is, the ideas disclosed in the above embodiments are applicable to any image processing apparatus that is an apparatus compositing a composition image with a photographed image and that displays a selection screen for selecting a composition image to be composited with the photographed image.

The embodiments described above disclose the following ides of an image processing apparatus etc. It is noted that the photo sticker creating apparatus 1 is one example of an image processing apparatus. The camera 21 is one example of a photographing device. Each of the storage portion 12, the removable medium 15, and the RAM 17 is one example of a storage portion. Each of a background set and a background image is one example of a composition image. A base image 71 is one example of an image selection region. The trimming range selection screen 200 is one example of a selection screen. The controller 11 is one example of a composition processing portion. The touch panel monitor 23 is one example of an instruction receiving device. A configuration of combination of the controller 11 and the touch panel monitor 23 is one example of a display device. Each of the printers 51*a* and 51*b* and the printing portion 130 is one example of a printing portion. In this case, the display device displays a selection screen that is a screen with which the user selects one of a plurality of trimming ranges, the trimming range being a range of trimming a part of the photographed image generated by the camera 21. In this case, the photographed image includes a moving image displayed on the live-view screen 201 and a still image after photographing. The display device sets the trimming range at a plurality of stages. In addition, the display device displays the trimming range in gray and/or with a frame. In addition, the display device further displays a frame indicative of a position of a user in the trimming range. Further, the display device displays the selection screen before photographing a user. Furthermore, the display device displays the selection screen after or during photographing a user. In addition, the display device displays the selection screen during edit of the photographed image to allow the user to select again the trimming range which has been selected once. In addition, the instruction receiving device receives selection of the trimming range on the selection screen. Further, the controller 11 is one example of a trimming processor and the trimming processor perform a trimming process on the photographed image generated by the camera 21 based on the trimming range selected with the instruction receiving device. In addition, the trimming processor executes the trimming processes based on the plurality of the trimming ranges, and the display device displays the images subjected to the trimming processes on the selection screen. Further, the trimming processor performs the trimming process for the same photographed image generated by the photographing device based on the plurality of the trimming ranges.

(1) An image processing apparatus (1) includes:
a photographing device (21) configured to photograph the user to generate a photographed image;
a display device (11, 23) configured to display a selection screen that is a screen with which the user selects one of a plurality of trimming ranges, the trimming range being a range of trimming a part of the photographed image generated by the photographing device;
an instruction receiving device (23) configured to receive selection of the trimming range on the selection screen; and
a trimming processor (23) configured to perform a trimming process on the photographed image generated by the photographing device based on the trimming range selected with the instruction receiving device.

A user can select the trimming selection range (the photographing range) from a plurality of selection range candidates before photographing through a simple operation of touching a touch panel, and therefore, the user can select a best composition for photographing without a complicated operation. In addition, a plurality of the trimming selection ranges is set in advance, and therefore, when the user selects one selection range out of a plurality of the trimming selection ranges, a video corresponding to the selected photographing range is immediately displayed. Therefore, it is possible to suppress an increase in processing load to the photo sticker creating apparatus, and photograph in a short time.

(2) In addition, the trimming range is set in a plurality of stages.

With this configuration, the trimming range corresponding to all the height can be selected from three stages set in advance. Therefore, even a user unfamiliar with the photo sticker creating apparatus can select a best trimming range through a simple operation.

(3) In addition, the photographed image is a moving image.

(4) The display device (11, 23) displays the trimming range.

This configuration facilitates the user to form an impression of an image after trimming.

(5) The display device (11, 23) displays the trimming range in gray and/or with a frame.

This configuration facilitates the user to form an impression of an image after trimming.

(6) The display device (11, 23) further displays a frame indicative of a position of the user in the trimming range.

This configuration facilitates the user to adjust the standing position of the user. Since the person frame corresponding to the number of users is displayed, the users can more properly be guided to positions in accordance with the number of the users.

(7) The trimming processor (11) executes the trimming processes based on the plurality of the trimming ranges, and the display device (11, 23) displays the images subjected to the trimming processes on the selection screen.

This configuration enables the user to select a best composition while visually comparing selectable trimming selection ranges on one screen at the same time.

(8) The trimming processor (11) performs the trimming process for the same photographed image generated by the photographing device based on the plurality of the trimming ranges.

(9) The display device (11, 23) displays the selection screen before photographing the user.

This configuration enables the user to photograph an image in a best composition.

(10) The display device (11, 23) displays the selection screen after or during photographing the user.

With this configuration, the user can change the trimming range even after photographing and therefore can acquire an image in a best composition.

(11) The display device (11, 23) displays the selection screen during edit of the photographed image to allow the user to select again the trimming range which has been selected once.

With this configuration, the user can change the trimming range even during edit and therefore can acquire an image in a best composition.

(12) The display device (11, 23) sets a relation between the trimming range and a range of an actual object for each of countries.

With this configuration, the height of the trimming range can be adjusted depending on a country even when an average height is different in each of countries. That is, when American having the average height higher than Japanese takes a photograph, an image can be taken in a good composition without stooping (without being in a half-sitting posture) in the photographing space R1. Further, users in Japan are mainly junior and senior high school girls and many users are short in height, while it is assumed that users of various heights use the apparatus in USA regardless of age or gender. Even in such a case, the height of the trimming range can be adjusted to cover all the height for each game, and therefore, an image can be photographed in a good composition for each game.

(13) An image processing method includes:
photographing a user;
displaying a selection screen that is a screen with which the user selects one of a plurality of trimming ranges, the trimming range being a range of trimming a part of the photographed image;
receiving selection of the trimming range on the selection screen; and
performing a trimming process on the photographed image based on the trimming range.

(14) A non-transitory computer-readable storage medium stores an image processing program for allowing a computer to execute the image processing method as described above.

What is claimed is:

1. An image processing apparatus for photographing a user, comprising:
a photographing device configured to photograph the user to generate a photographed image;
a display device configured to display a selection screen that is a screen with which the user selects one of a plurality of trimming ranges, each trimming range being a range of trimming a part of the photographed image generated by the photographing device, wherein each trimming range is predetermined and set before selection by the user;
an instruction receiving device configured to receive selection of the trimming range on the selection screen; and
a trimming processor configured to perform a trimming process on the photographed image generated by the photographing device based on the trimming range selected with the instruction receiving device.

2. The image processing apparatus according to claim 1, wherein the display device sets the trimming range in a plurality of stages.

3. The image processing apparatus according to claim 1, wherein the photographed image is a moving image.

4. The image processing apparatus according to claim 1, wherein the display device displays the trimming range.

5. The image processing apparatus according to claim 1, wherein the display device displays the trimming range in gray and/or with a frame.

6. The image processing apparatus according to claim 1, wherein the display device further displays a frame indicative of a position of the user in the trimming range.

7. The image processing apparatus according to claim 1, wherein the trimming processor executes the trimming processes based on the plurality of the trimming ranges, and
wherein the display device displays the images subjected to the trimming processes on the selection screen.

8. The image processing apparatus according to claim 7, wherein the trimming processor performs the trimming process for the same photographed image generated by the photographing device based on the plurality of the trimming ranges.

9. The image processing apparatus according to claim 1, wherein the display device displays the selection screen before photographing the user.

10. The image processing apparatus according to claim 1, wherein the display device displays the selection screen after or during photographing the user.

11. The image processing apparatus according to claim 1, wherein the display device displays the selection screen during edit of the photographed image to allow the user to select again the trimming range which has been selected once.

12. An image processing apparatus for photographing a user, comprising:
a photographing device configured to photograph the user to generate a photographed image;
a display device configured to display a selection screen that is a screen with which the user selects one of a plurality of trimming ranges, each trimming range being a range of trimming a part of the photographed image generated by the photographing device;
an instruction receiving device configured to receive selection of the trimming range on the selection screen; and
a trimming processor configured to perform a trimming process on the photographed image generated by the photographing device based on the trimming range selected with the instruction receiving device;
wherein the display device sets a relation between the trimming range and a range of an actual object for each of countries.

13. An image processing method for photographing a user as an object, the image processing method comprising:
photographing a user;
displaying a selection screen that is a screen with which the user selects one of a plurality of trimming ranges, each trimming range being a range of trimming a part of the photographed image, wherein each trimming range is predetermined and set before selection by the user;
receiving selection of the trimming range on the selection screen; and
performing a trimming process on the photographed image based on the selected trimming range.

14. A non-transitory computer-readable storage medium storing an image processing program for allowing a computer to execute the image processing method according to claim 13.

* * * * *